(12) United States Patent
Que

(10) Patent No.: US 8,635,443 B2
(45) Date of Patent: Jan. 21, 2014

(54) METHOD, DEVICE AND MOBILE TERMINAL FOR CHALLENGE HANDSHAKE AUTHENTICATION PROTOCOL AUTHENTICATION

(75) Inventor: Yuan Que, Qingdao (CN)

(73) Assignee: Hisense Mobile Communications Technology, Qingdao (CN)

( * ) Notice: Subject to any disclaimer, the term of this patent is extended or adjusted under 35 U.S.C. 154(b) by 35 days.

(21) Appl. No.: 13/382,441

(22) PCT Filed: Apr. 30, 2010

(86) PCT No.: PCT/CN2010/072355
§ 371 (c)(1),
(2), (4) Date: Jan. 5, 2012

(87) PCT Pub. No.: WO2011/035581
PCT Pub. Date: Mar. 31, 2011

(65) Prior Publication Data
US 2012/0110325 A1    May 3, 2012

(30) Foreign Application Priority Data

Sep. 25, 2009 (CN) .......................... 2009 1 0176058

(51) Int. Cl.
*H04L 29/06* (2006.01)
*H04L 9/32* (2006.01)

(52) U.S. Cl.
USPC ......................................................... 713/155

(58) Field of Classification Search
USPC ......................................................... 713/155
See application file for complete search history.

(56) References Cited

U.S. PATENT DOCUMENTS

| | | | |
|---|---|---|---|
| 2005/0099981 A1* | 5/2005 | Liu | 370/338 |
| 2005/0228992 A1* | 10/2005 | Mizikovsky | 713/168 |
| 2007/0294524 A1* | 12/2007 | Katano | 713/151 |

FOREIGN PATENT DOCUMENTS

| | | |
|---|---|---|
| CN | 1602111 | 3/2005 |
| CN | 101431508 | 5/2009 |
| CN | 101651945 | 2/2010 |
| JP | 2008085892 | 4/2008 |

OTHER PUBLICATIONS

International Search Report for PCT/CN2010/072355 dated Aug. 12, 2010.

* cited by examiner

*Primary Examiner* — Kambiz Zand
*Assistant Examiner* — Aubrey Wyszynski
(74) *Attorney, Agent, or Firm* — Foley & Lardner LLP; James F. Ewing

(57) ABSTRACT

A method, apparatus and mobile terminal for a Challenge Handshake Authentication Protocol (CHAP) authenticating in a CDMA Evolution to packet Data Optimized (EVDO) network are provided in the present invention. It makes the authentication process of EVDO network be successful, even though an authentication server does not support the Message Digest 5 (MD5) authentication method. The CHAP authentication method includes: receiving a CHAP authentication request which contains a first key value and is sent by an authentication server; when confirming that an identifier supporting MD5 authentication method is stored in the user identify module, calling MD5 authentication method to calculate a first authentication key value with the first key value, and sending the first authentication key value to the authentication server to authenticate; when receiving a CHAP re-authentication request which contains a second key value and is returned by the authentication server according to the first authentication key value after the authentication is failure, calling the Cellular Authentication and Voice Encryption (CAVE) authentication method to calculate a second authentication key value with the second key value, and sending the second authentication key value to the authentication server to authenticate.

12 Claims, 2 Drawing Sheets

METHOD, DEVICE AND MOBILE TERMINAL FOR CHALLENGE HANDSHAKE AUTHENTICATION PROTOCOL AUTHENTICATION

This application is the U.S. National Stage of PCT International Application Number PCT/CN2010/072355, filed Apr. 30, 2010, which claims priority to Chinese Patent Application No. 200910176058.0, filed with the State Intellectual Property Office of China on Sep. 25, 2009 and entitled "Method, Device and Mobile Terminal for Challenge Handshake Authentication Protocol, CHAP, Authentication". The entire contents of the foregoing applications are hereby incorporated by reference in their entireties.

FIELD OF THE INVENTION

The present invention relates to the field of wireless communications and particularly to a method, device and mobile terminal for Challenge Handshake Authentication Protocol, CHAP, authentication over a CDMA EVolution to packet Data Optimized (EVDO) network.

BACKGROUND OF THE INVENTION

A Code Division Multiple Access 1X (CDMA 1X) network and an EVDO network coexist for a long period of time during evolution of a Code Division Multiple Access (CDMA) network toward the $3^{rd}$ Generation (3G) wireless communication network. An authentication method for the EVDO network and that for the CDMA 1X network greatly differ in that a Message Digest 5 (MD5) authentication method is adopted for the EVDO network and a Cellular Authentication and Voice Encryption (CAVE) authentication method is adopted for the CDMA 1X network and hardened in a User Identity Module (UIM) card. In order to be able to support the use of the UIM card for the CDMA 1X network in the EVDO network, it is necessary for the existing authentication method for the EVDO network to support both the MD5 authentication method and the CAVE authentication method concurrently.

The authentication method for the EVDO network is performed generally in two steps: firstly a mobile terminal initiates Network Access Identifier (NAI) authentication, and then an authentication server initiates Challenge Handshake Authentication Protocol (CHAP) authentication. A processing flow of the CHAP authentication in a current general platform is as follows.

In the CHAP authentication process, the authentication server transmits to the mobile terminal a CHAP authentication request including a name of the CHAP authentication request, a description of the CHAP authentication request and a key value for authentication with a length of, e.g., 16 bytes. Upon reception of the CHAP authentication request, the mobile terminal obtains the key value and then invokes the MD5 authentication method for calculation if an identifier of supporting the MD5 authentication method is stored in the UIM card as determined in the NAI authentication process; otherwise, the mobile terminal invokes the CAVE authentication method for calculation if the UIM card supports the CAVE authentication method. A calculated authentication key value with the same length as that of the key value is transmitted to the authentication server, and the CHAP authentication passes after being verified by the authentication server without any mistake.

Next the authentication server transmits to the mobile terminal a username and a password for the mobile terminal to log in the EVDO network, and the mobile terminal logs in the EVDO network, then the entire authentication process ends.

Since some inevitable human mistakes may occur in the existing hybrid network, the foregoing CHAP authentication process suffers from some obvious drawbacks so that the CHAP authentication fails.

In the CHAP authentication process, the authentication server of the EVDO network may suffer from a drawback because the authentication server may support only the CAVE authentication method but cannot support the MD5 authentication method so that in the CHAP authentication process, when the MD5 authentication method is invoked in the UIM card, in which an identifier of supporting the MD5 authentication method is stored, to calculate and transmit a set of authentication key values to the authentication server for authentication, the CHAP authentication may fail because the authentication server cannot support the MD5 authentication method. Furthermore, there are some UIM cards in the market in which an identifier of supporting the MD5 authentication method is stored incorrectly, such a mistake occurs in a production process that the MD5 authentication method is not written into the UIM cards although the identifier of supporting the MD5 authentication method is stored therein, that is, the value at the N5 position is 11, therefore, the MD5 authentication method may fail to be invoked in the CHAP authentication process and thus the CHAP authentication fails.

SUMMARY OF THE INVENTION

An embodiment of the invention provides a method for Challenge Handshake Authentication Protocol, CHAP, authentication over a Code Division Multiple Access EVolution to packet Data Optimized, EVDO, network so that successful CHAP authentication over the EVDO network can be performed for a UIM card in which an identifier of supporting an MD5 authentication method is stored even if the MD5 authentication method is not supported by an authentication server.

To this end, an embodiment of the invention provides a method for Challenge Handshake Authentication Protocol, CHAP, authentication over a Code Division Multiple Access EVolution to packet Data Optimized, EVDO, network, which includes:

receiving a CHAP authentication request, carrying a first key value, which is transmitted from an authentication server;

invoking an MD5 authentication method to calculate a first authentication key value from the first key value upon determining that an identifier of supporting the MD5 authentication method is stored in a user identity module, and transmitting the first authentication key value to the authentication server for authentication; and invoking a CAVE authentication method to calculate a second authentication key value from a second key value upon reception of a CHAP re-authentication request, carrying the second key value, which is returned from the authentication server after failing in authentication with the first authentication key value, and transmitting the second authentication key value to the authentication server for authentication.

Furthermore, the method for CHAP authentication over an EVDO network further includes:

invoking the CAVE method to calculate a third authentication key value from a third key value upon invoking in failure the MD5 authentication method and upon reception of a CHAP re-authentication request, carrying the third key value, which is returned from the authentication server due to failing to receive the first authentication key value, and transmitting the third authentication key value to the authentication server for authentication.

A device for Challenge Handshake Authentication Protocol, CHAP, authentication over a Code Division Multiple Access EVolution to packet Data Optimized, EVDO, network includes:

a unit configured to receive a CHAP authentication request, carrying a first key value, which is transmitted from an authentication server;

a unit configured to invoke an MD5 authentication method to calculate a first authentication key value from the first key value upon determining that an identifier of supporting the MD5 authentication method is stored in a user identity module and transmit the first authentication key value to the authentication server for authentication; and a unit configured to invoke a CAVE authentication method to calculate a second authentication key value from a second key value upon reception of a CHAP re-authentication request, carrying the second key value, which is returned from the authentication server after failing in authentication with the first authentication key value and transmit the second authentication key value to the authentication server for authentication.

Furthermore, the device for CHAP authentication over an EVDO network further includes:

a unit configured to invoke the CAVE method to calculate a third authentication key value from a third key value upon invoking in failure the MD5 authentication method and upon reception of a CHAP re-authentication request, carrying the third key value, which is returned from the authentication server due to failing to receive the first authentication key value and transmit the third authentication key value to the authentication server for authentication.

A mobile terminal for a Code Division Multiple Access EVolution to packet Data Optimized, EVDO, network includes a Network Access Identifier, NAI, authentication device and a Challenge Handshake Authentication Protocol, CHAP, authentication device, wherein the CHAP authentication device includes:

a unit configured to receive a CHAP authentication request, carrying a first key value, which is transmitted from an authentication server;

a unit configured to invoke a Message Digest 5, MD5, authentication method to calculate a first authentication key value from the first key value upon determining that an identifier of supporting the MD5 authentication method is stored in a user identity module and transmit the first authentication key value to the authentication server for authentication; and a unit configured to invoke a Cellular Authentication and Voice Encryption, CAVE, authentication method to calculate a second authentication key value from a second key value upon reception of a CHAP re-authentication request, carrying the second key value, which is returned from the authentication server after failing in authentication with the first authentication key value and transmit the second authentication key value to the authentication server for authentication.

Furthermore, the NAI authentication device includes:

a unit configured to fetch an International Mobile Subscriber Identity, IMSI, of a user from the user identity module upon determining that the identifier of supporting the Message Digest 5, MD5, authentication method is stored in the user identity module but no NAI of the user is fetched from the user identity module;

a unit configured to derive an NAI of the user from the IMSI; and a unit configured to transmit the derived NAI to the authentication server for authentication.

Furthermore, the NAI authentication device includes:

a unit configured to fetch an NAI of a user from the user identity module upon determining that the identifier of supporting the Message Digest 5, MD5, authentication method is stored in the user identity module;

a unit configured to determine whether the NAI fetched from the user identity module is correct;

a unit configured to transmit the fetched NAI to the authentication server for authentication if the fetched NAI is correct; and a unit configured to fetch an International Mobile Subscriber Identity, IMSI, of the user from the user identity module if the fetched NAI is incorrect, derive an NAI of the user from the IMSI and transmit the derived NAI to the authentication server for authentication.

Furthermore, the NAI authentication device further includes:

a unit configured to fetch the International Mobile Subscriber Identity, IMSI, of the user from the user identity module when no NAI is fetched from the user identity module; and a unit configured to derive the NAI of the user from the IMSI and transmit the derived NAI to the authentication server for authentication.

The mobile terminal according to the embodiment of the invention invokes the MD5 authentication method to calculate from a first key value and transmit a first authentication key value to the authentication server for authentication when the mobile terminal determines that an identifier of supporting the MD5 authentication method is stored in a UIM card, and the mobile terminal invokes the CAVE authentication method to calculate a second authentication key value from a second key value in a CHAP re-authentication request returned from the authentication server after failing in authentication with the first authentication key value upon reception of the CHAP re-authentication request and transmits the second authentication key value to the authentication server for authentication, so that CHAP authentication can succeed for the UIM card in which an identifier of supporting the MD5 authentication method is stored even if the authentication server has a drawback of failing to support the MD5 authentication method.

DETAILED DESCRIPTION OF THE EMBODIMENTS

An authentication method for an EVDO network is performed generally in two steps that firstly a mobile terminal initiates NAI authentication and then an authentication server initiates CHAP authentication upon successful NAI authentication. After the two steps succeed, authentication passes, and next the authentication server transmits to the mobile terminal a username and a password for the mobile terminal to log in the EVDO network, and the mobile terminal logs in the EVDO network, then the entire authentication process ends.

Specifically, the authentication server requires provision of hardware identity (ID) authentication when the mobile terminal initiates a data call, and the so-called hardware ID refers to an Electronic Serial Number (ESN) or a Mobile Equipment Identifier (MEID) written when a cellular phone is in a factory for the purpose to identify the identity of the mobile terminal. The mobile terminal initiates the NAI authentication at the end of hardware ID authentication. The authentication server initiates the CHAP authentication upon successful NAI authentication. After the CHAP authentication passes, the authentication server transmits to the mobile terminal the username and the password for the mobile terminal to log in the EVDO network, and the mobile terminal logs in the EVDO network, then the entire authentication process ends.

In an NAI authentication method for an EVDO network according to an embodiment of the invention, it is determined from whether an identifier of supporting an MD5 authentication method is stored in a UIM card that whether the UIM card supports the MD5 authentication method, and if the UIM card support the MD5 authentication method, an NAI may be fetched directly from the UIM card for authentication, but in view of an error that may occur with the NAI stored in the UIM card, in the embodiment of the invention, after the NAI of a user is fetched from the UIM card, it is firstly determined whether the NAI is correct, and the fetched NAI is transmitted to an authentication server for authentication only if the fetched NAI is correct; if the fetched NAI is not correct, an IMSI of the user is further fetched from the UIM card, a correct NAI is derived according to the format of the NAI from the IMSI, and then the derived NAI is transmitted to the authentication server for authentication. The IMSI stored in the UIM card is definitely correct, so that for the UIM card in which the identifier of supporting the MD5 authentication method is stored, the NAI authentication can succeed with the IMSI stored in the UMI card even if the NAI stored in the UIM card is incorrect, furthermore, the NAI authentication can succeed with the IMSI stored in the UIM card even if no NAI is stored in the UIM card.

Figure 1:
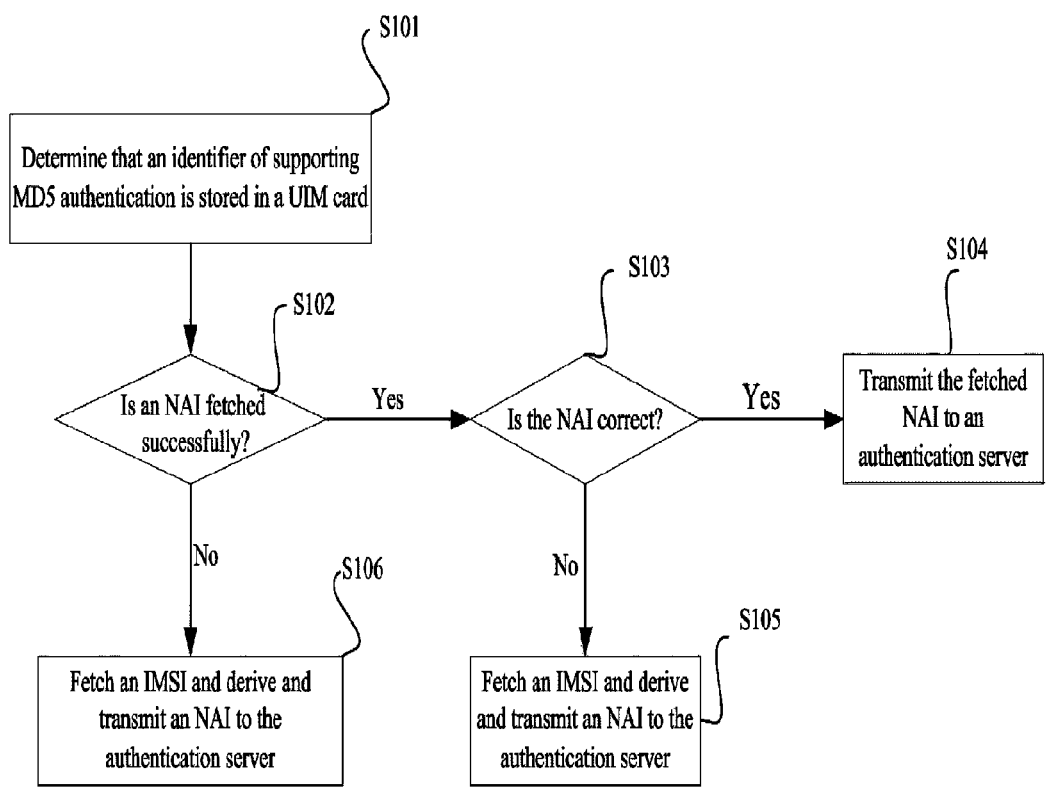
FIG. 1 is a flow chart of an NAI authentication method according to an embodiment of the invention.

Referring to FIG. 1, a flow of an NAI authentication method for an EVDO network according to an embodiment of the invention is described below in details, which includes the following steps.

S101: A mobile terminal determines that an identifier of supporting an MD5 authentication method is stored in a UIM card.

Particularly, the mobile terminal determines that the identifier of supporting the MD5 authentication method is stored in the UIM card in such a method that the mobile terminal firstly performs an operation of reading the UIM card after being powered on and determines that the identifier of supporting the MD5 authentication method is stored in the UIM card upon detecting that a value at the N5 position of the card is 11.

S102: The mobile terminal determines whether an NAI of a user is fetched successfully from the UIM card, and if so, the flow goes to a step S103; otherwise, the flow goes to a step S106.

S103: The mobile terminal determines whether the fetched NAI is correct.

A description is given by taking a Telecom required NAI as an example. A Telecom required NAI is IMSI@mycdma.cn, and it is determined that the NAI is correct as long as the fetched NAI is consistent with the Telecom required NAI, where IMSI is an International Mobile Subscriber Identity, and mycdma.cn represents a fixed domain name field of the EVDO network. The NAI may be incorrect due to an incorrect format, an incorrect character, etc.

S104: If the fetched NAI is correct, the fetched NAI is transmitted to an authentication server for authentication.

S105: If the fetched NAI is incorrect, an IMSI of the user is fetched from the UIM card, and an NAI of the user is derived from the IMSI, and the derived NAI is transmitted to the authentication server for authentication.

S106: The mobile terminal fetches the IMSI of the user from the UIM card, and derives the NAI of the user from the IMSI and transmits the derived NAI to the authentication server for authentication.

In the steps S105 and S106, according to the format IMSI@mycdma.cn of the NAI, the mobile terminal adds @mycdma.cn subsequent to the fetched IMSI and derives the NAI in the format of IMSI@mycdma.cn.

Particularly, the flow may proceed with step S105 when the result of determination is 'no' in the S103, so that the NAI authentication can succeed with the IMSI even if the incorrect NAI is written into the UIM card.

Furthermore, with the step S106 performed when the result of determination is 'no' in the step S102, it is possible for the UIM card in which the identifier of supporting the MD5 authentication method is stored to succeed in the NAI authentication with the IMSI stored in the UIM card even if no NAI is written into the UIM card.

An embodiment of the invention further provides an NAI authentication method for an EVDO network in which only the steps S101, S102 and S106 performed when the result of determination is 'no' in S102, so that the NAI authentication can succeed with an IMSI for a UIM card in which an identifier of supporting an MD5 authentication method is stored even if no NAI is written into the UIM card.

In order to succeed in NAI authentication for a UIM card in which an identifier of supporting an MD5 authentication method is stored even if an NAI in the UIM card is incorrect, an embodiment of the invention further provides an NAI authentication device in which the foregoing NAI authentication method is performed, the NAI authentication device includes:

a unit configured to fetch an NAI of a user from a UIM card upon determining that an identifier of supporting an MD5 authentication method is stored in the UIM card;

a unit configured to determine whether the NAI is correct;

a unit configured to transmit the fetched NAI to an authentication server for authentication if the NAI is correct; and a unit configured to fetch an IMSI of the user from the UIM card if the NAI is incorrect, derive an NAI of the user from the IMSI and transmit the derived NAI to the authentication server for authentication.

Furthermore, in order to derive an NAI and succeed in NAI authentication for the UIM card in which the identifier of supporting the MD5 authentication method is stored even if no NAI is written into the UIM card, the NAI authentication device according to the embodiment of the invention further includes:

a unit configured to fetch the IMSI of the user from the UIM card when no network access identifier is fetched from the UIM card; and a unit configured to derive the NAI of the user from the IMSI and transmit the derived NAI to the authentication server for authentication.

An embodiment of the invention provides a second NAI authentication device including:

a unit configured to fetch an International Mobile Subscriber Identity (IMSI) of a user from a user identity module upon determining that an identifier of supporting an MD5 authentication method is stored in the user identity module but no network access identifier of the user is fetched from the user identity module;

a unit configured to derive a network access identifier of the user from the IMSI; and a unit configured to transmit the derived network access identifier to an authentication server for authentication.

The foregoing technical solution relates to an NAI authentication method for an EVDO network, and integral authentication further involves CHAP authentication initiated from the authentication server to the mobile terminal, which is initiated by the authentication server to the mobile terminal after successful NAI authentication.

An embodiment of the invention further provides a CHAP authentication method. Upon reception of a CHAP authentication request, carrying a first key value, which is transmitted from an authentication server, a mobile terminal determines that an identifier of supporting an MD5 authentication method is stored in a VIM card, invokes the MD5 authentication method in the UIM card to calculate a first authentication key value from the first key value and transmits the first authentication key value to the authentication server for authentication, but in view of that the authentication server may not support the MD5 authentication method, in an embodiment of the invention, upon reception of a CHAP re-authentication request returned from the authentication server after failing in authentication with the first authentication key value, the mobile terminal invokes a CAVE authentication method to calculate a second authentication key value from a second key value in the CHAP re-authentication request and transmits the second authentication key value to the authentication server for authentication. The authentication server of the existing EVDO network definitely supports the CAVE authentication method, so that for the UIM card in which an identifier of supporting the MD5 authentication method is stored, the CHAP authentication can succeed even if the authentication server has a drawback of failing to support the MD5 authentication method, furthermore, the CHAP authentication can succeed by invoking the CAVE authentication method to calculate a third authentication key value and transmitting the third authentication key value to the authentication server even if the MD5 authentication method is not written into the UIM card although an identifier of supporting the MD5 authentication method is stored therein, moreover, the CHAP authentication can succeed by invoking directly the CAVE authentication method to calculate a fourth authentication key value and transmitting the fourth authentication key value to the authentication server even if the UIM card supports only the CAVE authentication method.

Figure 2:
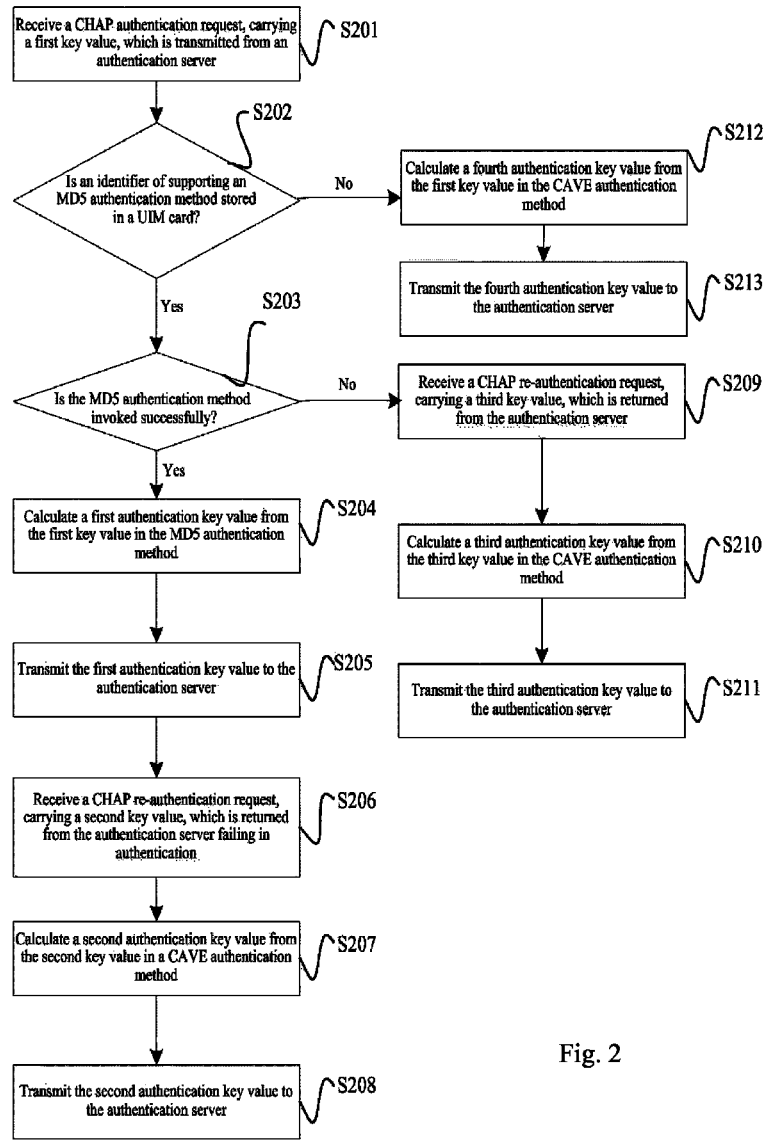
FIG. 2 is a flow chart of a CHAP authentication method according to an embodiment of the invention.

As illustrated in FIG. 2, a flow of a CHAP authentication method according to an embodiment of the invention is as follows.

S201: A mobile terminal receives a CHAP authentication request transmitted from an authentication server, the CHAP authentication request carries a name of the authentication request, a description of the authentication request and a first key value, and the mobile terminal fetches the first key value upon reception of the CHAP authentication request.

S202: The mobile terminal determines whether an identifier of supporting an MD5 authentication method is stored in a UIM card, and if so, the flow goes to a step S203; otherwise, the flow goes to steps S212 to S213.

Specifically, the mobile terminal firstly performs an operation of reading the UIM card after being powered on and determines that the identifier of supporting the MD5 authentication method is stored in the UIM card upon detecting that a value at the N5 position of the UIM card is 11.

S203: The mobile terminal determines whether the MD5 authentication method is invoked successfully, and if so, the flow goes to steps S204 to S208; otherwise, the flow goes to steps S209 to S211.

S204: The mobile terminal calculates a first authentication key value from the first key value in the MD5 authentication method.

S205: The mobile terminal transmits the first authentication key value to the authentication server for authentication.

Particularly, if the authentication server supports the MD5 authentication method, the authentication succeeds, and then the CHAP authentication ends directly. If the authentication server does not support the MD5 authentication method, the authentication fails, and then the flow continues with a step S206.

S206: The mobile terminal receives a CHAP re-authentication request, carrying a name of the re-authentication request, a description of the re-authentication request and a second key value, which is returned from the authentication server after failing in the authentication with the first authentication key value.

S207: The mobile terminal invokes a CAVE authentication method to calculate a second authentication key value from the second key value in the CHAP re-authentication request.

S208: The mobile terminal transmits the second authentication key value to the authentication server for authentication.

S209: The mobile terminal receives a CHAP re-authentication request, carrying a third key value, which is returned from the authentication server due to failing to receive the first authentication key value.

S210: The mobile terminal invokes the CAVE authentication method to calculate a third authentication key value from the third key value.

S211: The mobile terminal transmits the third authentication key value to the authentication server for authentication.

S212: The mobile terminal invokes the CAVE authentication method to derive a fourth authentication key value from the first key value in the CHAP authentication request.

S213: The mobile terminal transmits the fourth authentication key value to the authentication server for authentication.

Particularly, the flow may proceed with the steps S209 to S211 when the result of determination is 'no' in the step S203, so that the CHAP authentication can succeed even if the authentication server does not support the MD5 authentication method.

Furthermore, with the steps S209 to S211 performed when the result of determination is 'no' in the step S203, the CHAP authentication can succeed even if the MD5 authentication method is not written into the UIM card although the identifier of supporting the MD5 authentication method is stored in the UIM card.

Particularly, the flow may proceed with the steps S212 to S213 when the result of determination is 'no' in the step S202 so that the CHAP authentication can succeed for the UIM card in which the identifier of supporting the MD5 authentication method is stored.

Furthermore, with the steps S212 to S213 performed when the result of determination is 'no' in the step S202, the CHAP authentication can succeed even if the mobile terminal determines that the UIM card supports only the CAVE authentication method.

In order to succeed in CHAP authentication for a UIM card in which an identifier of supporting an MD5 authentication method is stored even if an authentication server does not support the MD5 authentication method, an embodiment of the invention further provides a CHAP authentication device in which the foregoing CHAP authentication method is performed, the CHAP authentication device includes:

a unit configured to receive a CHAP authentication request, including a first key value, which is transmitted from an authentication server;

a unit configured to invoke an MD5 authentication method to calculate a first authentication key value from the first key value upon determining that an identifier of supporting the MD5 authentication method is stored in a UIM card and transmit the first authentication key value to the authentication server for authentication; and a unit configured to invoke a CAVE authentication method to calculate a second authentication key value from a second key value in a CHAP re-authentication request returned from the authentication server after failing in authentication with the first authentication key value upon reception of the CHAP re-authentication request and transmit the second authentication key value to the authentication server for authentication.

Furthermore, in order to succeed in CHAP authentication for the UIM card in which an identifier of supporting the MD5 authentication method is stored even if the MD5 authentication method is not written into the UIM card, the CHAP authentication device according to the embodiment of the invention further includes:

a unit configured to invoke the CAVE authentication method to calculate a third authentication key value from a third key value upon reception of a CHAP re-authentication request, carrying the third key value, which is returned from the authentication server due to failing to receive the first authentication key value when the MD5 authentication method is invoked in failure and transmit the third authentication key value to the authentication server for authentication.

The foregoing NAI authentication method and CHAP authentication method according to the embodiments of the invention may be used in combination, therefore, an embodiment of the invention further provides a mobile terminal including all of function units as described above.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

The invention claimed is:

1. A method for Challenge Handshake Authentication Protocol, CHAP, authentication over a Code Division Multiplex Access Evolution to packet Data Optimized, EVDO, network, comprising:

receiving a CHAP authentication request, carrying a first key value, which is transmitted from an authentication server;

invoking a Message Digest 5, MD5, authentication method to calculate a first authentication key value from the first key value upon determining that an identifier of supporting the MD5 authentication method is stored in a user identity module, and transmitting the first authentication key value to the authentication server for authentication; and invoking a Cellular Authentication and Voice Encryption, CAVE, authentication method to calculate a second authentication key value from a second key value upon reception of a CHAP re-authentication request, carrying the second key value, which is returned from the authentication server after failing in authentication with the first authentication key value, and transmitting the second authentication key value to the authentication server for authentication.

2. The method for CHAP authentication over an EVDO network of claim 1, further comprising:

invoking the CAVE method to calculate a third authentication key value from a third key value upon invoking in failure the MD5 authentication method and upon reception of a CHAP re-authentication request, carrying the third key value, which is returned from the authentication server due to failing to receive the first authentication key value, and transmitting the third authentication key value to the authentication server for authentication.

3. A device for Challenge Handshake Authentication Protocol, CHAP, authentication over a Code Division Multiplex Access Evolution to packet Data Optimized, EVDO, network, comprising:

a unit configured to receive a CHAP authentication request, carrying a first key value, which is transmitted from an authentication server;

a unit configured to invoke a Message Digest 5, MD5, authentication method to calculate a first authentication key value from the first key value upon determining that an identifier of supporting the MD5 authentication method is stored in a user identity module and transmit the first authentication key value to the authentication server for authentication; and a unit configured to invoke a Cellular Authentication and Voice Encryption, CAVE, authentication method to calculate a second authentication key value from a second key value upon reception of a CHAP re-authentication request, carrying the second key value, which is returned from the authentication server after failing in authentication with the first authentication key value and transmit the second authentication key value to the authentication server for authentication.

4. The device for CHAP authentication over an EVDO network of claim 3, further comprising:

a unit configured to invoke the CAVE method to calculate a third authentication key value from a third key value upon invoking in failure the MD5 authentication method and upon reception of a CHAP re-authentication request, carrying the third key value, which is returned from the authentication server due to failing to receive the first authentication key value and transmit the third authentication key value to the authentication server for authentication.

5. A mobile terminal for a Code Division Multiplex Access Evolution to packet Data Optimized, EVDO, network, comprising a Network Access Identifier, NAI, authentication device and a Challenge Handshake Authentication Protocol, CHAP, authentication device, wherein the CHAP authentication device comprises:

a unit configured to receive a CHAP authentication request, carrying a first key value, which is transmitted from an authentication server;

a unit configured to invoke a Message Digest 5, MD5, authentication method to calculate a first authentication key value from the first key value upon determining that an identifier of supporting the MD5 authentication method is stored in a user identity module and transmit the first authentication key value to the authentication server for authentication; and a unit configured to invoke a Cellular Authentication and Voice Encryption, CAVE, authentication method to calculate a second authentication key value from a second key value upon reception of a CHAP re-authentication request, carrying the second key value, which is returned from the authentication server after failing in authentication with the first authentication key value and transmit the second authentication key value to the authentication server for authentication.

6. The mobile terminal for an EVDO network of claim 5, wherein the CHAP authentication device further comprises:
a unit configured to invoke the CAVE method to calculate a third authentication key value from a third key value upon invoking in failure the MD5 authentication method and upon reception of a CHAP re-authentication request, carrying the third key value, which is returned from the authentication server due to failing to receive the first authentication key value and transmit the third authentication key value to the authentication server for authentication.

7. The mobile terminal for an EVDO network of claim 5, wherein the NAI authentication device comprises:
a unit configured to fetch an International Mobile Subscriber identity, IMSI, of a user from the user identity module upon determining that the identifier of supporting the Message Digest 5, MD5, authentication method is stored in the user identity module but no NAI of the user is fetched from the user identity module;
a unit configured to derive an NAI of the user from the IMSI; and
a unit configured to transmit the derived NAI to the authentication server for authentication.

8. The mobile terminal for an EVDO network of claim 5, wherein the NAI authentication device comprises:
a unit configured to fetch an NAI of a user from the user identity module upon determining that the identifier of supporting the Message Digest 5, MD5, authentication method is stored in the user identity module;
a unit configured to determine whether the NAI fetched from the user identity module is correct;
a unit configured to transmit the fetched NAI to the authentication server for authentication if the fetched NAI is correct; and
a unit configured to fetch an International Mobile Subscriber Identity, IMSI, of the user from the user identity module if the fetched NAI is incorrect, derive an NAI of the user from the IMSI and transmit the derived NAI to the authentication server for authentication.

9. The mobile terminal for an EVDO network of claim 8, wherein the NAI authentication device further comprises:
a unit configured to fetch the International Mobile Subscriber Identity, IMSI, of the user from the user identity module when no NAI is fetched from the user identity module; and
a unit configured to derive the NAI of the user from the IMSI and transmit the derived NAI to the authentication server for authentication.

10. The mobile terminal for an EVDO network of claim 6, wherein the NAI authentication device comprises:
a unit configured to fetch an International Mobile Subscriber Identity, IMSI, of a user from the user identity module upon determining that the identifier of supporting the Message Digest 5, MD5, authentication method is stored in the user identity module but no NAI of the user is fetched from the user identity module;
a unit configured to derive an NAI of the user from the IMSI; and
a unit configured to transmit the derived NAI to the authentication server for authentication.

11. The mobile terminal for an EVDO network of claim 6, wherein the NAI authentication device comprises:
a unit configured to fetch an NAI of a user from the user identity module upon determining that the identifier of supporting the Message Digest 5, MD5, authentication method is stored in the user identity module;
a unit configured to determine whether the NAI fetched from the user identity module is correct;
a unit configured to transmit the fetched NAI to the authentication server for authentication if the fetched NAI is correct; and
a unit configured to fetch an International Mobile Subscriber Identity, IMSI, of the user from the user identity module if the fetched NAI is incorrect, derive an NAI of the user from the IMSI and transmit the derived NAI to the authentication server for authentication.

12. The mobile terminal for an EVDO network of claim 11, wherein the NAI authentication device further comprises:
a unit configured to fetch the International Mobile Subscriber Identity, IMSI, of the user from the user identity module when no NAI is fetched from the user identity module; and
a unit configured to derive the NAI of the user from the IMSI and transmit the derived NAI to the authentication server for authentication.

* * * * *